E. H. NOLAN.
SUPPLY VALVE.
APPLICATION FILED AUG. 14, 1912.
1,147,639.
Patented July 20, 1915.
2 SHEETS—SHEET 1.
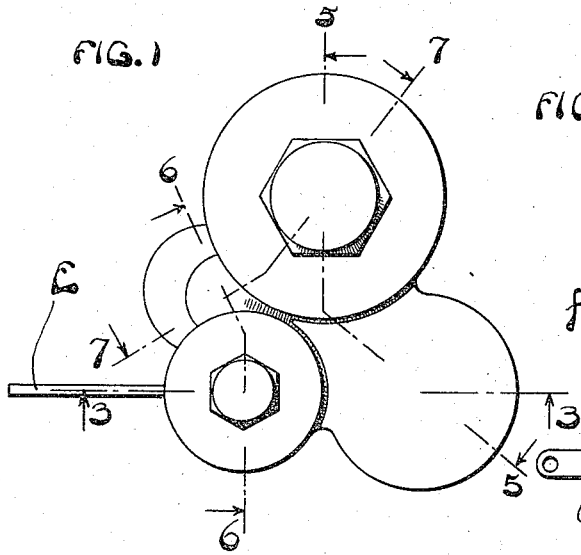
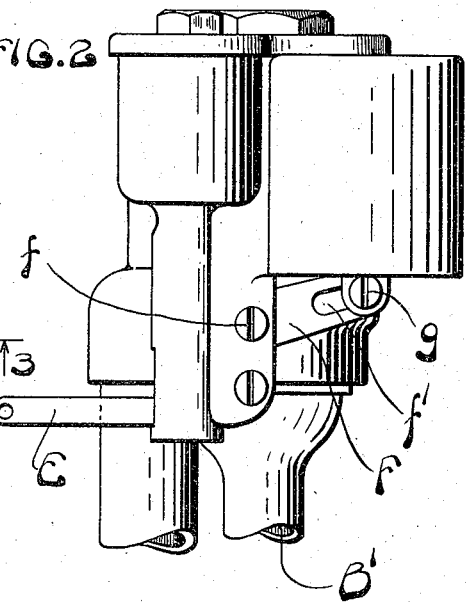
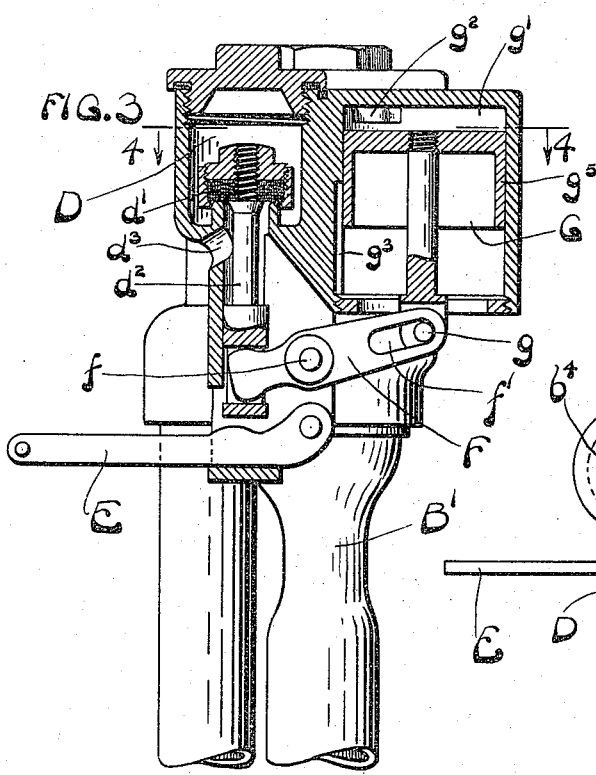
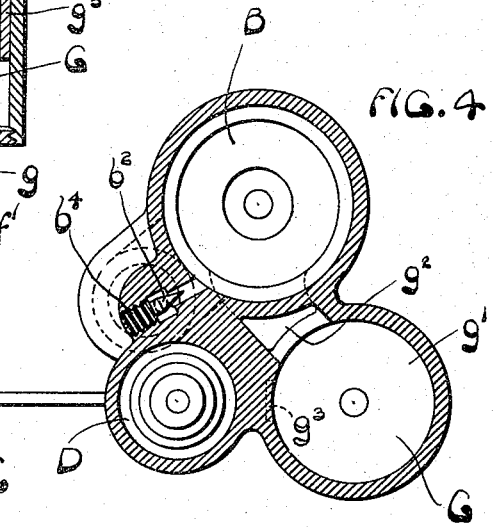
Inventor
Edward Harry Nolan
Witnesses
By Murray & McAllister
his Attorneys

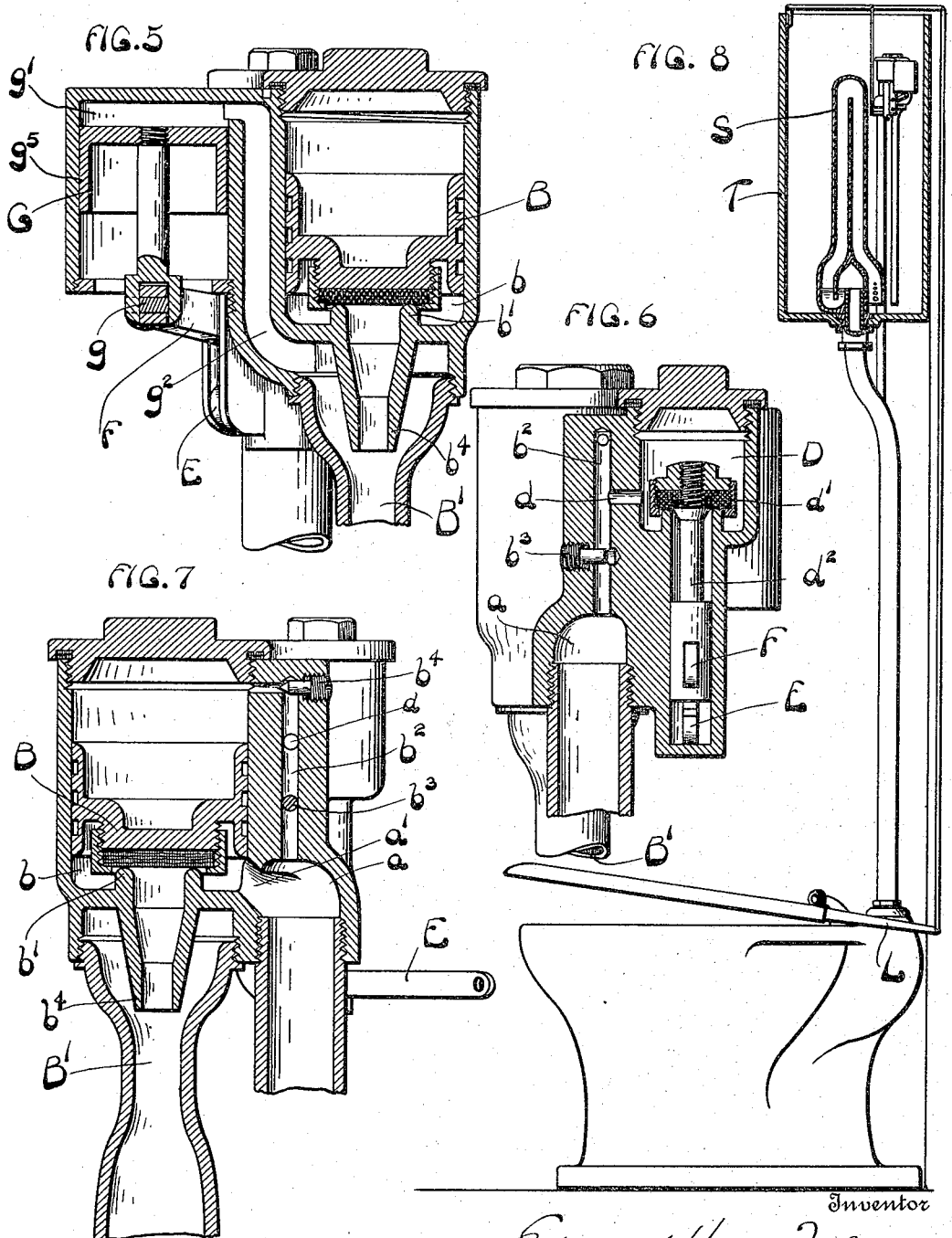

UNITED STATES PATENT OFFICE.

EDWARD HARRY NOLAN, OF CINCINNATI, OHIO.

SUPPLY-VALVE.

1,147,639.

Specification of Letters Patent.

Patented July 20, 1915.

Application filed August 14, 1912. Serial No. 714,972.

*To all whom it may concern:*

Be it known that I, EDWARD HARRY NOLAN, a citizen of the United States of America, and resident of Cincinnati, county of Hamilton, and State of Ohio, have invented certain new and useful Improvements in Supply-Valves, of which the following is a specification.

My invention relates to supply valves, the means for closing which are actuated by the water which fills the tank.

The object of my invention is a supply valve, which may be used in an open topped tank, and the closing means of which is independent of floats. This object is obtained by the means illustrated in the accompanying drawings, in which—

Figure 1 is a plan view of a supply valve embodying my invention. Fig. 2 is a side elevation of the same. Fig. 3 is a sectional view taken upon line 3—3 of Fig. 1. Fig. 4 is a section taken upon line 4—4 of Fig. 3. Fig. 5 is a sectional view taken upon line 5—5 of Fig. 1. Fig. 6 is a sectional view taken upon line 6—6 of Fig. 1. Fig. 7 is a view, partially in section, of a tank and a water siphon used in connection therewith, and upon line 7—7 of Fig. 1. Fig. 8 is a view partially in section and partially in elevation, of a tank and flush bowl equipped with an embodiment of my invention.

In the supply valve embodying my invention the inlet valve is closed by a suction, which is created at the time the water in the tank has reached its pre-determined height, by the water at the discharge outlet of the valve.

Referring to the drawings: I will describe first the means whereby the valve is opened to permit water to flow from the mains into the tank. The inlet port $a$ is connected with the chamber $b$ of the main or inlet valve B by a channel $a'$, which is below the valve seat $b'$ and is connected with said chamber by a channel $b^2$ in which is located a choke valve $b^3$, and an adjusting valve $b^4$. The channel $b^2$ communicates with a chamber D by means of a channel $d$, which is between the choke valve $b^3$ and the valve $b^4$. Within the chamber D is a manually actuated valve $d'$, the stem $d^2$ of which is above the manually actuated lever E. When the lever E is raised it lifts the valve $d'$ from its seat, the pressure of water holding the valve B to its seat is then released from the chamber D through the channel $b^2$, channel $d$ and outlet $d^3$, which is below the seat of valve $d'$ and leads into the tank T. The pressure above the valve B being relieved, water from the main lifts the valve and passes out into the converging diverging nozzle B′. Water will thus continue to be discharged, until the valve $d'$ is reseated, at which time pressure in the chamber $b$ above the valve B will be restored by water passing from the inlet $a$ up through the channel $b^2$, and into the chamber. The rate at which the water flows from the inlet through the channel $b^2$ is regulated by means of the valve $b^4$.

I will now describe the means by which valve $d'$ is seated, after having been lifted from its seat by the lever E. The stem $d^2$ of valve $d'$ is engaged by a lever F, which is fulcrumed in the valve casing at $f$. The lever F is actuated, to reseat the valve $d'$, by means of the piston G, whose stem has a pin $g$, which engages an elongated slot $f'$ in the lever F. The piston G is located in a chamber $g'$, which is open at the bottom and the upper end of which communicates with the outlet B′ through a bypass $g^2$. The discharge orifice below the valve seat $b'$ is surrounded by a nozzle $b^4$ which projects downwardly into the nozzle B′ and coöperates therewith to form an ejector, which, when the valve B is raised and water is flowing therethrough, is capable of drawing air through the passage $g^2$ from the chamber $g'$. A groove $g^3$ is formed in the walls of the chamber $g'$ and is so located that its upper edge is uncovered by the piston G when it is moved to its lowest position by the operation of the lever E. This establishes communication between the upper and lower ends of the chamber $g'$, and consequently permits the ejector to create an unrestricted flow of air through the passage $g^2$. The piston G is provided with a depending flange $g^5$, which coöperates with the groove $g^3$, when the piston is in its lowest position, to form a passage, the lower or inlet end of which is located approximately on a level with the lower end of the chamber $g'$. With this arrangement the piston G will be moved upwardly as soon as the passage of air through the groove $g^3$ is restricted, sufficiently to create a reduction of pressure in the chamber $g'$ above the piston. The upward movement of the piston G is accomplished as soon as the water in the tank reaches or submerges the lower and open end of the chamber $g'$.

The first movement of the piston G, in response to the reduction of air pressure occasioned by the ejector action, closes the upper end of the groove $g^3$, and shuts off the admission of air to the upper end of the chamber $g'$. This causes the pressure in the upper end of the chamber to be quickly reduced below the pressure existing in the lower end of the chamber and causes the piston to move up quickly and positively and to firmly seat the valve $d'$. The seating of the valve $d'$ checks the flow of water from the inlet port $a$, through the passage $b^2$ and the port $d^3$, and causes pressure to pile up in the chamber $b$ above the valve B. This moves the valve B to its seat and shuts off the flow of water through the nozzle B′ into the tank. The ejector action ceases as soon as the flow of water ceases, and the air pressure in the upper end of the chamber $g'$ is immediately increased to atmospheric pressure. The piston G is, however, held in the upper position by the water pressure on the upper face of the valve $d'$.

The valve $b^3$ is employed to regulate the flow of water through the passages $b^2$ and $d$, so that the valve $d'$ will not be prematurely closed by water pressure through the passage $d$. The valve $b^4$ is employed for the purpose of adjusting the delivery of water to the chamber $b$, as has been said, and is preferably so constructed that it is capable of a fine adjustment, so that the pressure above the valve B will not pile up sufficiently to close the valve B until after the valve $d'$ has been moved to its seat. The valve, as illustrated, is located in the tank T at the desired height and is arranged to operate in conjunction with an air bound siphon S, which will empty the tank T as soon as the valve B is closed. It will be understood, however, that the valve may be used in conjunction with any type of discharge apparatus and that the lever E may be actuated by a manually operable lever, instead of the seat actuated lever L, illustrated.

It will also be understood that various means for creating the reduction of pressure, or the suction for actuating the piston valve, may be employed; for example, the converging diverging nozzle B′ may be dispensed with, and the piston G may be actuated by the flow of water passing out of the tank. This may be accomplished by so forming the passage $g^2$ that it communicates with the discharge siphon S. With such an arrangement the upper end of the chamber $g'$ will be subjected to a reduction of pressure, occasioned by the flow of water through the siphon, and the piston will rise in response thereto, and will operate to close the valve $d'$. The passage $g^2$ will preferably communicate with the inlet side of the siphon and the groove $g^3$ may or may not be employed, as desired. Under some conditions it may be desirable to actuate the piston G in the manner just described, since the valve B, when so controlled, remains open until the flush tank is filled, or until the velocity of discharge through the siphon S is established, at which time it will be positively closed.

In accordance with the United States patent statutes I have described and illustrated the preferred embodiment of my invention, but I desire it to be understood that various changes, modifications and substitutions may be made in the details of construction without departing from the spirit and scope of my invention as set forth in the appended claims.

What I claim is:

1. In combination with a flush tank, a supply valve having an inlet port, communicating with a pressure supply pipe, and a discharge port, a pressure actuated valve disk for controlling the delivery from the inlet port through the discharge port, a pressure chamber inclosing said valve disk and having a pressure delivery port, an auxiliary valve for controlling the pressure in said chamber, manually operable means for opening said auxiliary valve to exhaust the pressure from the chamber to raise the valve disk, and means actuated by suction created by the delivery of water through the discharge port for closing the auxiliary valve to confine the pressure in the chamber to close the valve disk.

2. In combination with a tank, a supply valve comprising a pressure actuated member for controlling the delivery of liquid to the tank, manually operable means for controlling the delivery of actuating liquid to the member, fluid actuated means operatively connected to the manually operable means and provided with a submergible air delivery port for controlling the delivery of air pressure thereto.

3. In combination with a tank, a supply valve comprising a casing having a water inlet and a water delivery port, a pressure actuated member for controlling the delivery of water through said ports, manually operable means for controlling the actuating pressure of said member, a device, responsive to fluid pressure, operatively connected to the manually operable means and provided with a submergible port for controlling the delivery of air pressure thereto, and means whereby a flow of water creates a flow of air through said port.

4. A valve comprising a casing having an inlet port, a delivery port and a liquid pressure chamber formed therein, a disk located within the chamber and responsive to liquid pressure, for controlling the delivery of liquid through said ports, an auxiliary valve for controlling the liquid pressure within the chamber, manually operable means for opening the valve and relieving the pressure in the chamber, means for creating variations in air pressure, in response to variations in liquid flow, a fluid pressure responsive device, communicating with said means and operatively connected to the auxiliary valve and having a submergible port for controlling the delivery of air to said means.

5. A valve comprising a casing having a liquid inlet, a liquid delivery port and a liquid pressure chamber formed therein, a disk movably mounted within the chamber, and responsive to variations in liquid pressure, for controlling the flow of liquid through said ports, an auxiliary valve for controlling the delivery of liquid from the chamber, manually operable means for opening the valve, an ejector actuated by a flow of liquid, for creating variations in air pressure, a plunger for closing the valve and responsive to variations in pressure induced by the ejector, a casing inclosing the plunger and having a passage capable of being closed by the plunger, for delivering air around the plunger, to the ejector.

6. In combination with a flush tank, a valve comprising a casing having an inlet port, a delivery port and a liquid pressure chamber formed therein, a disk for controlling the flow of liquid through the ports, responsive to variations in pressure within the chamber, means for delivering liquid under pressure to the chamber, a manually openable valve for controlling the delivery of liquid from the chamber, a liquid actuated ejector for creating variations in air pressure, a piston responsive to variations in fluid pressure, for closing the auxiliary valve, a casing inclosing the piston and having a port formed therein for delivering air around the piston to the ejector and capable of being submerged by liquid within the tank, for controlling the delivery of air to the ejector.

7. In combination with a flush tank, a valve comprising a casing having formed therein an inlet port, a delivery port, a pressure chamber and passages for delivering liquid to, and for discharging liquid from, the pressure chamber, a member responsive to variations of liquid pressure within the chamber for controlling the passage of liquid through the ports, an auxiliary valve for controlling the delivery of liquid from the chamber, a liquid-actuated ejector for creating variations of air pressure, a piston responsive to variations in air pressure, occasioned by the ejector, for closing the auxiliary valve, a casing inclosing the piston and communicating with the ejector, and provided with an air passage for delivering air around the piston to the ejector, one end of the air passage being capable of being closed by the piston and the other end being capable of being submerged by liquid in the tank, and manually operable means for opening the auxiliary valve and for moving the piston to uncover one end of the passage.

8. The combination with a flush tank, a supply valve comprising a casing having a pressure chamber, a releasing chamber communicating with said pressure chamber, and an air chamber communicating with said pressure chamber, a pressure actuated supply valve located in said pressure chamber, a release valve located in said release chamber, an air actuated plunger located in said air chamber and adapted to be actuated by fluid passing through the valve, manually operated means adapted to operate said release valve to release the pressure within said pressure chamber, whereby the supply valve may be operated, and means connecting the release valve and air plunger, whereby the motion of the air plunger will close the release valve.

9. In combination with a tank, a supply valve comprising a casing having an inlet and discharge port formed therein, a pressure actuated member adapted to control the delivery of fluid from the inlet through the discharge port, a manually operated valve adapted to control said pressure actuated member to discharge fluid through said discharge port, and means connected with said manually operated valve, controlled by the pressure actuated member and adapted to close the manually actuated valve when said pressure actuated member is actuated, whereby the pressure actuated member may be caused to close said discharge port.

EDWARD HARRY NOLAN.

Witnesses:
E. W. McCALLISTER,
W. THORNTON BOGERT.